(12) United States Patent
Jywe et al.

(10) Patent No.: US 11,290,571 B2
(45) Date of Patent: Mar. 29, 2022

(54) MANY-TO-MANY STATE IDENTIFICATION SYSTEM OF EQUIPMENT NAMES THAT ARE BROADCASTED FROM INTERNET-OF-THINGS

(71) Applicant: National Formosa University, Huwei (TW)

(72) Inventors: Wen-Yuh Jywe, Huwei (TW);
Tung-Hsien Hsieh, Huwei (TW);
Tung-hsing Hsieh, Huwei (TW);
Yung-Chuan Huang, Huwei (TW);
Ming-Sung Hsieh, Huwei (TW);
Yung-Yi Huang, Huwei (TW)

(73) Assignee: NATIONAL FORMOSA UNIVERSITY, Huwei Township (TW)

( * ) Notice: Subject to any disclaimer, the term of this patent is extended or adjusted under 35 U.S.C. 154(b) by 0 days.

(21) Appl. No.: 16/862,311

(22) Filed: Apr. 29, 2020

(65) Prior Publication Data

US 2021/0258402 A1 Aug. 19, 2021

(30) Foreign Application Priority Data

Feb. 13, 2020 (TW) .................. 109104613

(51) Int. Cl.
*H04L 29/08* (2006.01)
*H04W 48/10* (2009.01)
(Continued)

(52) U.S. Cl.
CPC .............. *H04L 67/36* (2013.01); *G06T 11/00* (2013.01); *H04L 67/125* (2013.01);
(Continued)

(58) Field of Classification Search
CPC ....... H04L 67/36; H04L 67/125; H04L 67/12; H04L 1/00; H04L 43/00; H04L 43/50;
(Continued)

(56) References Cited

U.S. PATENT DOCUMENTS

2018/0181094 A1* 6/2018 Funk .................. H04L 12/2816

OTHER PUBLICATIONS

Kruger, Antonio, and Xiaoyi Jiang. "Improving human computer interaction through embedded vision technology." 2007 IEEE International Conference on Multimedia and Expo. IEEE, 2007. (Year: 2007).*

* cited by examiner

*Primary Examiner* — Sharad Rampuria
(74) *Attorney, Agent, or Firm* — Sinorica LLC

(57) ABSTRACT

A many-to-many state identification system of equipment names broadcasted from Internet-of-Things comprises IoT nodes and IoT mobile devices connecting the IoT nodes wirelessly. Each IoT node receives the sensed value of transducer on a machine element, determining whether the sensed value of transducer is abnormal. Next, the IoT node broadcasts an equipment identification name containing an existing gateway identification code and a state code of transducer showing whether the transducer is abnormal. When the IoT mobile device scans the equipment identification name broadcasted from the IoT node, a visual interface displays the state of IoT node by identifying the gateway identification code and the state code. Accordingly, before connecting the IoT mobile device to the IoT node, the state of transducer in the IoT node is acquired, allowing any IoT mobile device to monitor any transducer in a synchronous and many-to-many manner within the broadcasting area.

15 Claims, 4 Drawing Sheets

(51) Int. Cl.

| | |
|---|---|
| *H04W 8/00* | (2009.01) |
| *G06T 11/00* | (2006.01) |
| *H04W 24/08* | (2009.01) |
| *G16Y 10/70* | (2020.01) |
| *G16Y 10/75* | (2020.01) |
| *H04L 67/75* | (2022.01) |
| *H04L 67/125* | (2022.01) |

(52) U.S. Cl.
CPC ........... *H04W 8/005* (2013.01); *H04W 24/08* (2013.01); *H04W 48/10* (2013.01); *G06T 2200/24* (2013.01); *G16Y 10/70* (2020.01); *G16Y 10/75* (2020.01)

(58) Field of Classification Search
CPC .... G06T 11/00; G06T 2200/24; H04W 8/005; H04W 24/08; H04W 48/10; H04W 4/70; H04W 56/00; G16Y 10/70; G16Y 10/75; G16Y 40/10; H04B 17/00
See application file for complete search history.

MANY-TO-MANY STATE IDENTIFICATION SYSTEM OF EQUIPMENT NAMES THAT ARE BROADCASTED FROM INTERNET-OF-THINGS

BACKGROUND OF THE INVENTION a) Field of the Invention

The present invention relates to a state identification system, and more particularly to a many-to-many state identification system of equipment names that are broadcasted from Internet-of-Things (IoT).

b) Description of the Prior Art

When an existing IoT gateway, in conjunction with a transducer, is used locally to monitor the state of machine element or equipment, a user can only use an IoT mobile device, such as cell phone or laptop computer, to connect the IoT gateway wirelessly in a one-to-one manner. Or, the user can connect a different IoT gateway wirelessly at a different time, so as to connect the IoT gateway in the same area to access the sensed value of each transducer, thereby determining the state of sensed object.

In an existing one-to-many connection manner, multiple IoT devices can be connected to a server or router at the local end. However, when executing the many-to-many accessing or monitoring, the server or router at the local end must be capable of connecting an extranet to upload the local data onto a public cloud, so that the users of various IoT mobile devices can log onto the public cloud to access the data in the public cloud.

In the abovementioned monitoring method, each IoT mobile device can determine the state of each transducer in the same area only when the IoT mobile device is connected wirelessly to an IoT gateway. Therefore, even the user can switch to connect a different IoT gateway wirelessly using the IoT mobile device, there will still be a time gap in the process of switching the wireless connection that the user will not be able to know the state of sensed object, and thus cannot monitor effectively each sensed object corresponding to each IoT gateway and transducer in the same area or in environment without the online ability.

SUMMARY OF THE INVENTION

When the existing IoT gateway, in conjunction with the transducer, monitors a machine element or equipment, the user can only use an IoT mobile device to connect the IoT gateway before knowing the state of sensed object; therefore, the sensed object cannot be monitored effectively. Accordingly, the present invention discloses a many-to-many state identification system of equipment names that are broadcasted from IoT, wherein based on the sensed state of transducer, each IoT node broadcasts outward various equipment identification names using a wireless communication module, so that an IoT mobile device can scan to know in time whether the sensed object of associated IoT node in the same area is abnormal, in the environment without the online ability.

When the IoT node is sold abroad along with the equipment, the IoT mobile device can be installed with an APP to scan the IoT node and access the data in the IoT node. Next, network connection, such as 4G, is activated to upload the data onto an IoT cloud platform, allowing the equipment manufacturer to be aware of the state of product after selling.

To achieve the abovementioned object, the present invention provides a many-to-many state identification system of equipment names that are broadcasted from IoT, comprising more than one IoT node and more than one IoT mobile device which can be connected wirelessly to the IoT node.

Each IoT node includes an IoT gateway and more than one transducer, and each IoT gateway is provided with a gateway identification code and a microcontroller. In addition, the IoT gateway is also provided with a wireless communication module and plural transducer ports which are connected electrically to the microcontroller, respectively. The wireless communication module broadcasts outward an equipment identification name which is constituted by the gateway identification code and a state code of the existing IoT gateway. The said more than one transducer is connected electrically to the plural transducer ports, respectively. The microcontroller executes a threshold determination program which sets up a normal value and an abnormal value for each transducer. When the threshold determination program determines that the sensed value of each transducer meets the normal value, the state code of the equipment identification name that is broadcasted outward from the wireless communication module is normal. On the other hand, when the threshold determination program determines that the sensed value of any transducer is the abnormal value, the microcontroller will be enabled to update the state code of the broadcasted equipment identification name to the abnormal value.

Each IoT mobile device executes an IoT software to scan and acquire the equipment identification name broadcasted outward from each IoT node. The IoT software can identify the gateway identification code and the state code of the equipment identification name, and display on a visual interface of the IoT software whether the state of IoT node is normal or abnormal.

Furthermore, in the present invention, after the IoT mobile device is connected to any IoT node, the sensed value of the transducer in the IoT node is displayed on the visual interface of the IoT mobile device.

Furthermore, the threshold determination program executed by the microcontroller of the IoT gateway sets up an alert value for each transducer. When the threshold determination program determines that the sensed value of any transducer is the alert value, the microcontroller will be enabled to update the state code of the broadcasted equipment identification name to the alert value. In addition, the IoT software executed by the IoT mobile device will identify the state code of the equipment identification name as the alert value, and the visual interface will display that the state of the IoT node is alert.

Furthermore, each transducer in each IoT node is provided with a transducer identification code, and the equipment identification name that is broadcasted outward is also provided with a transducer code. When the threshold determination program determines that the sensed value of any transducer is the abnormal value, the transducer code will show the transducer identification code of the transducer of which the sensed value is the abnormal value.

Furthermore, when the IoT software executed by the IoT mobile device is connected to any IoT node, the transducer identification code of the transducer in the IoT node is compiled optionally.

Furthermore, each IoT node is installed on a machine element, and the machine element is sensed by more than one transducer in the IoT node. The equipment identification name that is broadcasted outward also includes an element manufacturer code and an element model number code corresponding to the machine element. After the said IoT mobile device scans and acquires the equipment identification name that is broadcasted outward from the IoT node, a picture of each machine element corresponding to the gateway identification code, a picture corresponding to the element manufacturer code, and the element model number code will be displayed on the visual interface of each IoT mobile device.

Furthermore, the more than one machine element described in the present invention is the machine element in different part of a same mechanical equipment. When the IoT mobile device is connected to the IoT node that shows abnormal, the IoT software executed by the IoT mobile device will execute a troubleshooting script based on the attribute of the transducer of which the sensed value is abnormal value, guiding the user to trouble shoot the machine element step-by-step by augmented reality (AR) images, subtitles and voices from the IoT mobile device.

It is preferably that the IoT mobile device described in the present invention is provided with the AR function and an IoT cloud platform. The IoT node uploads the equipment identification name and the sensed value of transducer to the IoT cloud platform in real time using the wireless communication module. After the IoT cloud platform generates a scan, a label of the equipment identification name and the sensed value of transducer is downloaded in real time. The label is provided for scanning by the IoT mobile device or more than one AR device; whereas, the IoT mobile device or AR device displays in real time the state of IoT node, as well as displays the sensed value of transducer in AR.

Upon using the present invention, at least one machine element is installed with the IoT node. By the transducer in the IoT node, the state of the machine element is sensed, and the equipment identification name sent out from the IoT node in the same area is scanned by the IoT mobile device without the online ability, so that before connecting the IoT node, the IoT mobile device can be aware of the state of transducer in the IoT node within the broadcasting area, achieving the effect that any IoT device can monitor any transducer in a synchronous and many-to-many manner to effectively monitor each sensed object in each IoT node. Therefore, when the IoT mobile device is capable of connecting online, the data in the IoT node can be accessed and uploaded to the IoT cloud platform.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
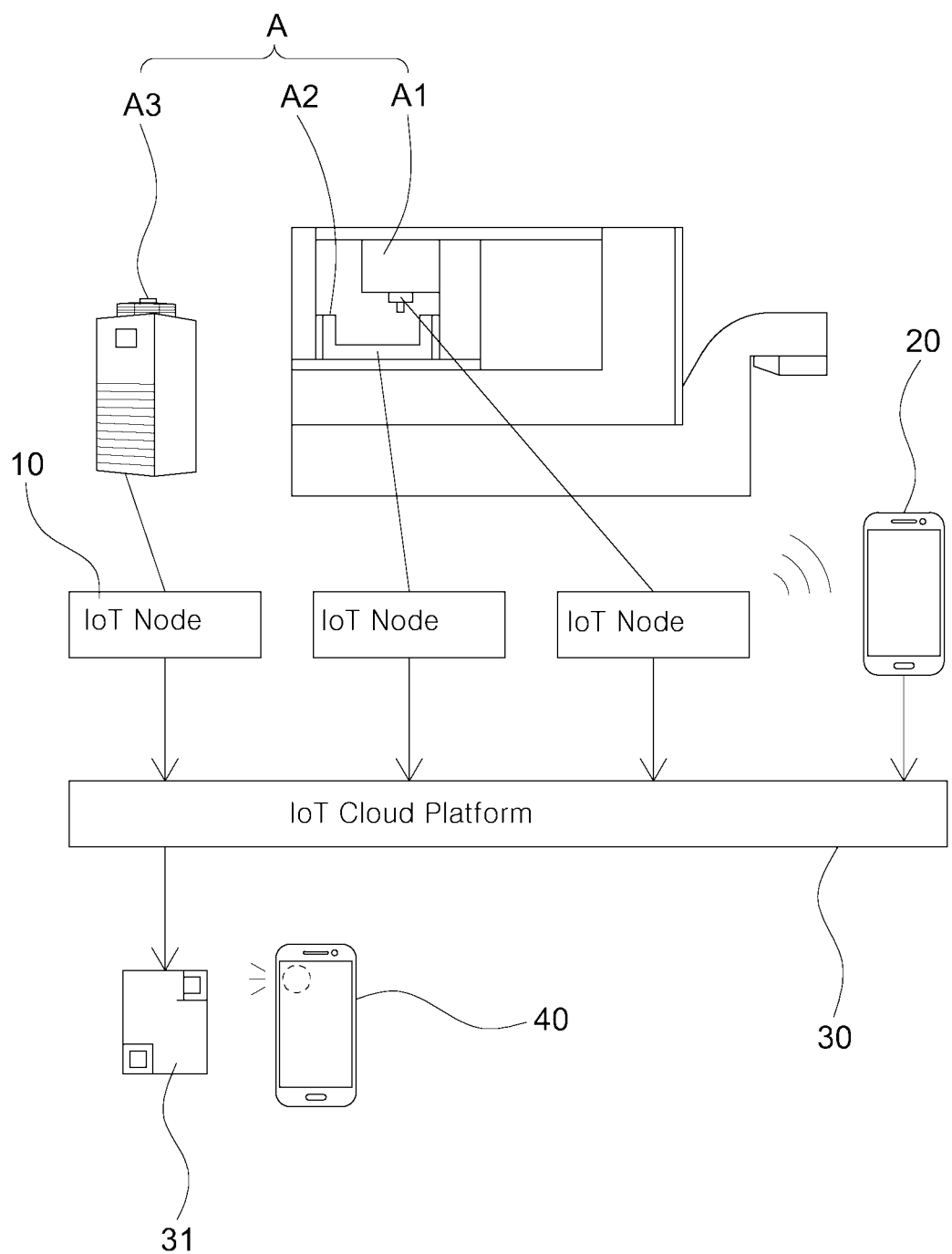
FIG. 1 shows a system diagram of a preferred embodiment of the present invention.

Referring to FIGS. 1 to 4, the present invention discloses a many-to-many state identification system of equipment names that are broadcasted from IoT, comprising more than one IoT node 10 and more than one IoT mobile device 20 which is able to connect each IoT node 10 wirelessly in environment without the online ability. The system is also provided with an IoT cloud platform 30 fitting with each IoT node 10 and each IoT mobile device 20. In addition, there is more than one AR device 40 outside the IoT mobile 20, or the IoT mobile 20 is built in with the AR function correspondingly. As in a preferred embodiment of the present invention, a principal shaft system A1, an index plate system A2, and a cooling system A3 of a machine tool A in a same mechanical equipment are installed respectively with a said IoT node 10.

Each IoT node 10 includes an IoT gateway 11 (containing an access space and a database) and more than one transducer 12. The IoT nodes 10 installed on the principal shaft system A1 and the index plate system A2 include two transducers 12 to sense temperature and vibration respectively; whereas, the IoT node 10 installed on the cooling system A3 includes two transducers 12 to sense oil temperature and fan current. Each IoT gateway 11 is provided with a unique gateway identification code 111 to identify identity, and each transducer 12 is also provided with a unique transducer identification code 121 to identify identity.

Figure 3:
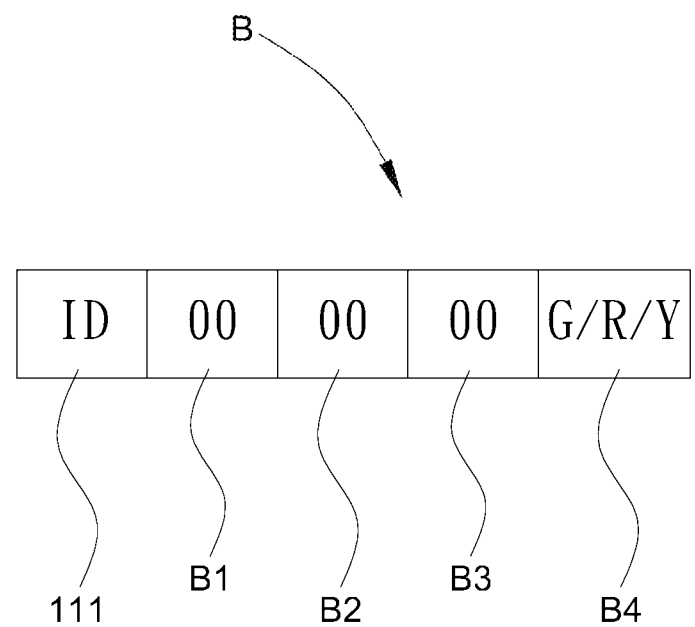
FIG. 3 shows a schematic view of equipment identification name, according to the preferred embodiment of the present invention.

Each IoT gateway 11 is provided with a microcontroller 112, as well as a wireless communication module 113 and plural transducer ports 114 which are connected electrically with the microcontroller 112 respectively. The wireless communication module 113 can be a WIFI, Bluetooth or ZigBee module. As shown in FIG. 3, the wireless communication module 113 broadcasts outward an equipment identification name B. In the present preferred embodiment, the equipment identification name B is an SSID (Service Set Identifier) and is constituted by the gateway identification code 111 of existing IoT gateway 11, an element manufacturer code B1, an element model number code B2, a transducer code B3 and a state code B4. The element manufacturer code B1 and the element model number code B2 correspond to the provided machine element, such as the codes of manufacturer and element model number of the principal shaft system A1, the index plate system A2 and the cooling system A3 in the present preferred embodiment. The transducer code B3 is the transducer identification code 121 of the transducer 12, displaying that whether the state is alert or abnormal. In the present preferred embodiment, the state code B4 includes the letters of G, Y, R, representing normal green, abnormal yellow and alert red respectively. Each transducer 12 of the said IoT gateway 11 is connected electrically with plural transducer ports 114.

The microcontroller 112 of each IoT gateway 11 executes a threshold determination program C. The threshold determination program C sets up a normal value, an abnormal value and an alert value for a sensed value of each transducer 12 according to a practical need. When the threshold determination program C determines that the sensed value of each transducer 12 meets the normal value, the state code B4 of the equipment identification code B that is broadcasted outward from the wireless communication module 113 is a normal G. When the threshold determination program C determines that the sensed value of any transducer 12 is the alert value, the microcontroller 112 will be enabled to update the state code B4 of the broadcasted equipment identification name B to an alert Y. On the other hand, when the threshold determination program C determines that the sensed value of any transducer 12 is the abnormal value, the microcontroller 112 will be enabled to update the state code B4 of the broadcasted equipment identification name B to an abnormal R. The threshold determination program C displays the abovementioned transducer identification code 11 of the transducer 12 of which the state is alert or abnormal as the transducer code B3 in the broadcasted equipment identification name B.

When each IoT node 10 receives the sensed value of each transducer 12 and updates the broadcasted equipment identification name B, the updated equipment identification name B and the sensed value of each transducer 12 will also be uploaded in real time to the IoT cloud platform 30 through the wireless communication module 113. The said IoT mobile device 20 can be connected with the IoT cloud platform 30 through internet to access the data uploaded from the IoT node 10. Through the said state code B4, the equipment identification name B generated by the IoT node 10 can be used to identify which machine element in which IoT node 10, a.k.a. the principal shaft system A1, the index plate system A2 or the cooling system A3 in the present preferred embodiment, is in the state of alert or abnormality. In addition, through the said transducer code B3, which sensed part of the machine element can be further identified to be problematic.

The said IoT mobile device 20 can be a smart phone, a laptop computer, a desktop computer or a PLC (Programmable Logic Controller) which can connect online, or can be the IoT cloud platform 30. In the present preferred embodiment, the IoT mobile device 20 used is a smart phone with the AR function. Each IoT mobile device 20 executes an IoT software D to scan each IoT gateway 11 to access the equipment identification name B that is broadcasted outward from each IoT node 10. The said equipment identification name B can be also acquired by connecting the IoT mobile device 20 to the IoT cloud platform 30.

Figure 2:
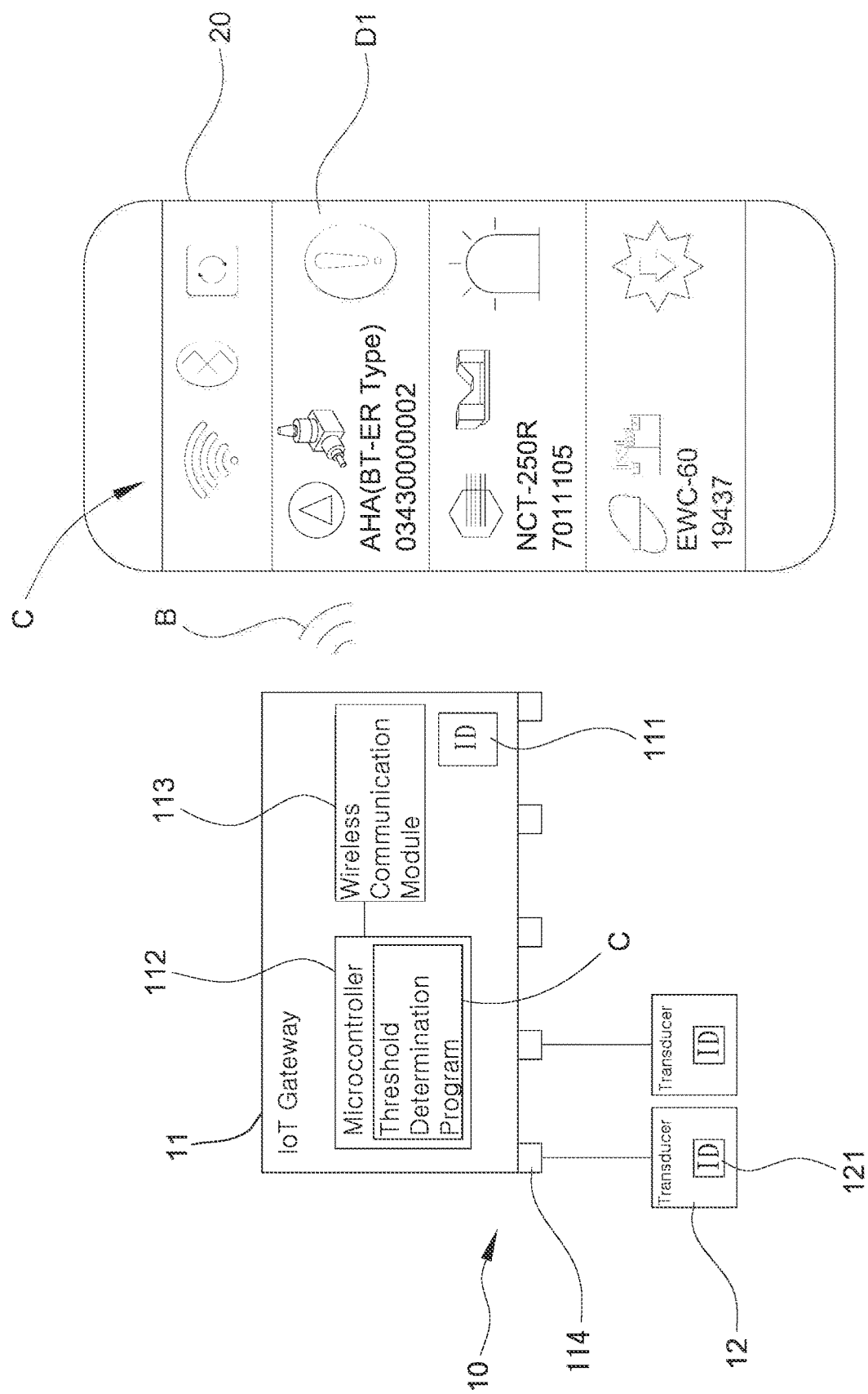
FIG. 2 shows a schematic view of IoT node and IoT mobile device, according to the preferred embodiment of the present invention.
Figure 4:
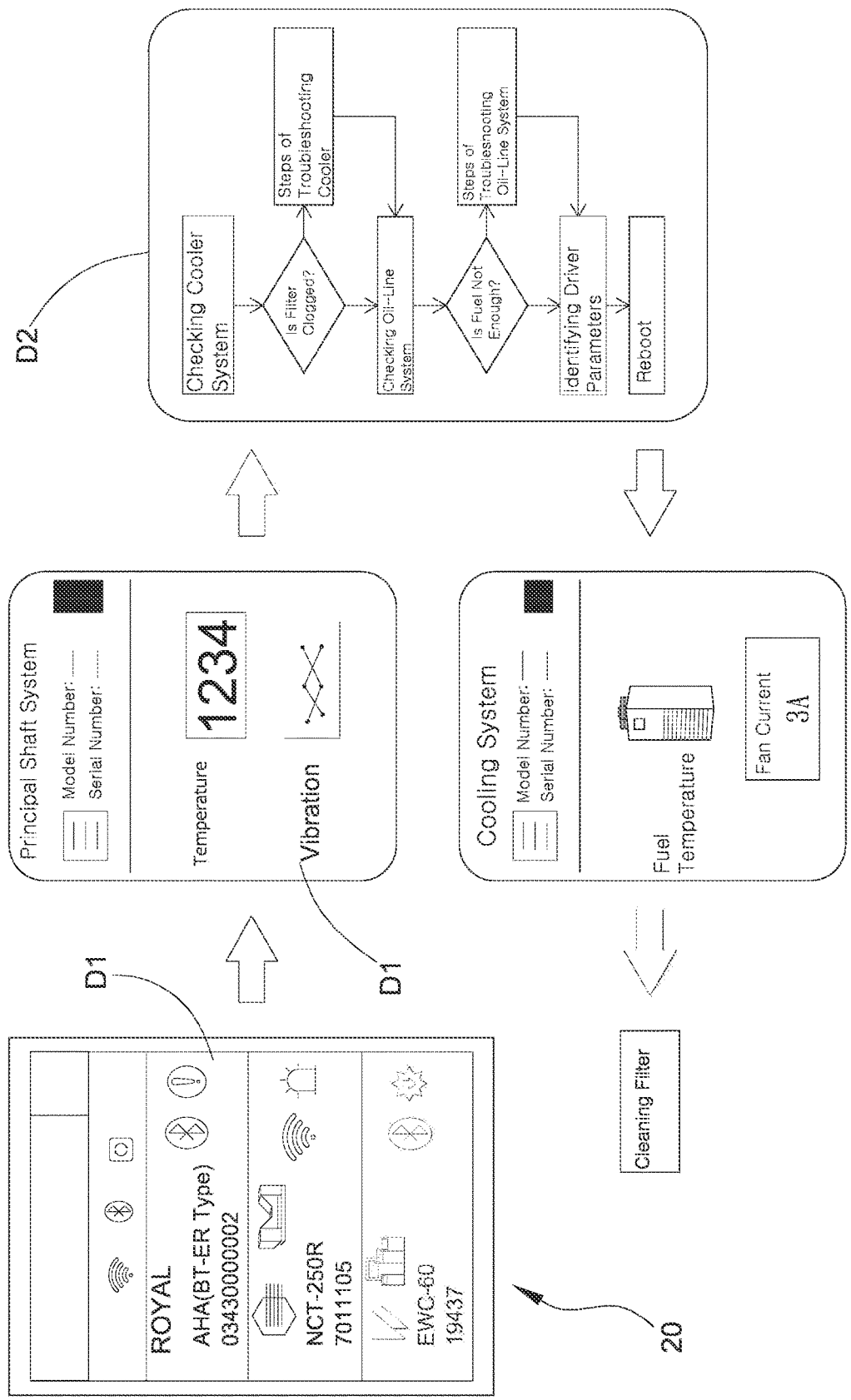
FIG. 4 shows a flow diagram of executing a troubleshooting script, according to the preferred embodiment of the present invention.

The IoT software D identifies the gateway identification code 111, the element manufacturer code B1, the element model number code B2 and the state code B4 of each equipment identification name B. Referring to FIG. 2, a visual interface D1 of the IoT software D displays the state of the IoT node 10 as normality, alert or abnormality, and displays a picture of each machine element corresponding to the gateway identification code 111, a picture corresponding to the element manufacturer code B1, and the element model number. In addition, after the user employs the IoT mobile device 20 to connect any IoT node 10, as shown in FIG. 4, the sensed value of the transducer 12 in the IoT node 10 will be displayed on the said visual interface D1 of the IoT mobile device 20. When the IoT software D executed by the IoT mobile device 20 is connected to any IoT node 10, the transducer identification code 121 of the transducer 12 in the IoT node 10 can be compiled optionally.

Referring to FIG. 2 and FIG. 4, when the IoT mobile device 20 is connected to the IoT node 10 showing abnormal (in the present preferred embodiment, the IoT node 10 installed on the principal shaft system A1 shows abnormal, and the IoT node 10 installed on the cooling system A3 shows alert), the IoT software D executed by the IoT mobile device 20 will execute a pre-designed troubleshooting script D2 based on the attribute of the related transducer 12, guiding the user to trouble shoot the machine element (i.e., principal shaft system A1) step-by-step using the AR images, subtitles and voices from the IoT mobile device 20. For example, in the present preferred embodiment, the troubleshooting script identifies step-by-step that the major cause of temperature abnormality to the principal shaft system A1 lies in the fan current of the cooling system A3; therefore, the problem can be removed by cleaning the filter according to the instruction in the script.

The said AR device 40 is a smart phone in the present preferred embodiment. Corresponding to the equipment identification name B and the sensed value of transducer 12 that are uploaded in real time from the IoT node 10, the said IoT cloud platform 30 will generate a scan and then download in real time a label 31 of the said equipment identification name B and the said sensed value of transducer 12. The label 31 can be a two-dimensional barcode containing a hyperlink URL (Uniform Resource Locator), and is disposed on a machine element, printer matter or webpage which is installed on the IoT node 10, providing for scanning by the IoT mobile device 20 or the AR device 40. In addition, the screen of IoT mobile device 20 or AR device 40 will display in real time the state of IoT node 10, and display the sensed value of transducer 12 in AR.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A many-to-many state identification system of equipment names that are broadcasted from Internet-of-Things, comprising:

an IoT node and an IoT mobile device which is connected wirelessly to the IoT node, wherein the IoT node includes an IoT gateway and plural transducers with that the IoT gateway is provided with a gateway identification code and a microcontroller, the IoT gateway is also provided with a wireless communication module and plural transducer ports which are connected electrically to the microcontroller respectively, the wireless communication module broadcasts outward an equipment identification name, the equipment identification name is constituted by the gateway identification code and a state code of the existing IoT gateway, the transducers are connected electrically with the transducer ports respectively;

the microcontroller executes a threshold determination program, and the threshold determination program sets up a normal value and an abnormal value for the transducer;

when the threshold determination program determines that the sensed value of each transducer meets the normal value, the state code of the equipment identification name that is broadcasted outward from the wireless communication module is normal, whereas when the threshold determination program determines that the sensed value of any transducer is the abnormal value, the microcontroller is enabled to update the state code of the broadcasted equipment identification name to the abnormal value;

the IoT mobile device executes an IoT software to scan and acquire the equipment identification name that is broadcasted outward from the IoT node, the IoT software identifies the gateway identification code and the state code of the equipment identification name, and a visual interface of the IoT software displays the state of IoT node as normal or abnormal; and the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

2. The many-to-many state identification system of equipment names that are broadcasted from Internet-of-Things, according to claim 1, wherein after the IoT mobile device is connected optionally to any IoT node, the sensed value of transducer in the IoT node is displayed on the visual interface of the IoT mobile device.

3. The many-to-many state identification system of equipment names that are broadcasted from Internet-of-Things, according to claim 1, wherein the threshold determination program executed by the microcontroller of the IoT gateway sets up an alert value for the transducer, and when the threshold determination program determines that the sensed value of any transducer is the alert value, the microcontroller is enabled to update the state code of the broadcasted equipment identification name to the alert value, with that the visual interface displays the state of the IoT node as alert, when the IoT software executed by the IoT mobile device determines that the state code of equipment identification name is the alert value.

4. The many-to-many state identification system of equipment names that are broadcasted from Internet-of-Things, according to claim 1, wherein the transducer in the IoT node is provided with a transducer identification code, and the broadcasted equipment identification name also includes a transducer code, with that when the threshold determination program determines that the sensed value of any transducer is the abnormal value, the transducer code shows the transducer identification code of the transducer of which the sensed value is the abnormal value.

5. The many-to-many state identification system of equipment names that are broadcasted from Internet-of-Things, according to claim 4, wherein when the IoT software executed by the IoT mobile device is connected to any IoT node, the transducer identification code of the transducer in the IoT node is compiled optionally.

6. The many-to-many state identification system of equipment names that are broadcasted from Internet-of-Things, according to claim 4, wherein the IoT node is installed on a machine element to use the transducer in the IoT node to monitor the machine element, and the broadcasted equipment identification name also includes an element manufacturer code and an element model number code corresponding to the machine element, with that after the IoT mobile device scans and acquires the equipment identification name that is broadcasted from the IoT node, a picture of machine element corresponding to the gateway identification code, a picture corresponding to the element manufacturer code, and the element model number are displayed on the visual interface of the IoT mobile device.

7. The many-to-many state identification system of equipment names that are broadcasted from Internet-of-Things, according to claim 6, wherein the machine element is a machine element in different part of a same mechanical equipment, and when the IoT mobile device is connected with the IoT node showing abnormal, the IoT software executed by the IoT mobile device executes a troubleshooting script based on the attribute of transducer of which the sensed value is the abnormal value, guiding a user to troubleshoot the machine element step-by-step using AR images, subtitles and voices from the IoT mobile device.

8. The many-to-many state identification system of equipment names that are broadcasted from Internet-of-Things, according to claim 2, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

9. The many-to-many state identification system of equipment names that are broadcasted from Internet-of-Things, according to claim 3, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

10. The many-to-many state identification system of equipment names that are broadcasted from Internet-of-Things, according to claim 4, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

11. The many-to-many state identification system of equipment names that are broadcasted from Internet-of-Things, according to claim 5, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

12. The many-to-many state identification system of equipment names that are broadcasted from Internet-of-Things, according to claim 6, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

13. The many-to-many state identification system of equipment names that are broadcasted from Internet-of-Things, according to claim 7, wherein the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

14. A many-to-many state identification system of equipment names that are broadcasted from Internet-of-Things, comprising:

an IoT node, an IoT cloud platform and an IoT mobile device, wherein the IoT node includes an IoT gateway and plural transducers, the IoT gateway is provided with a gateway identification code and a microcontroller, the IoT gateway is also provided with a wireless communication module and plural transducer ports which are connected electrically with the microcontroller respectively, the wireless communication module broadcasts outward an equipment identification name, the equipment identification name is constituted by the gateway identification code and a state code of the existing IoT gateway, the plural transducers are connected electrically with the transducer ports respectively, the microcontroller executes a threshold determination program, and the threshold determination program sets up a normal value and an abnormal value for the transducer;

when the threshold determination program determines that the sensed value of each transducer meets the normal value, the state code of the equipment identification name that is broadcasted outward from the wireless communication module is the normal value, whereas when the threshold determination program determines that the sensed value of any transducer is the abnormal value, the microcontroller is enabled to update the state code of the broadcasted equipment identification name to the abnormal value;

the IoT cloud platform receives the equipment identification name that is uploaded from the IoT node through the wireless communication module;

the IoT mobile device executes an IoT software, the IoT software is connected to the IoT cloud platform to acquire the equipment identification name in the IoT node, the IoT software identifies the gateway identification code and the state code of the equipment identification name, and a visual interface of the IoT software displays the state of the IoT node as normal or abnormal and the IoT mobile device is provided with an AR function, and an IoT cloud platform is provided, with that the IoT node uploads in real time the equipment identification name and the sensed value of transducer to the IoT cloud platform using the wireless communication module, the IoT cloud platform generates a scan and then downloads in real time a label of the equipment identification name and the sensed value of transducer, the label provides for scanning by the IoT mobile device or an AR device, the IoT mobile device or the AR device displays in real time the state of IoT node and displays the sensed value of transducer in AR.

15. The many-to-many state identification system of equipment names that are broadcasted from Internet-of-Things, according to claim 8, wherein the threshold determination program executed by the microcontroller of the IoT gateway sets up an alert value for the transducer, and when the threshold determination programs determines that the sensed value of any transducer is the alert value, the microcontroller is enabled to update the state code of the broadcasted equipment identification name to the alert value, with that the visual interface displays the state of the IoT node as alert, when the IoT software executed by the IoT mobile device determines that the state code of the equipment identification name is the alert value.

* * * * *